United States Patent
Ingold

[15] 3,691,846
[45] Sept. 19, 1972

[54] MEASURING INSTRUMENT EQUIPPED WITH REMOVABLE MEASURED VALUE TRANSMITTER PROBE

[72] Inventor: Werner Ingold, Uitikon, Switzerland
[73] Assignee: Proton AG, Zug, Switzerland
[22] Filed: Feb. 3, 1971
[21] Appl. No.: 112,149

[30] Foreign Application Priority Data

Dec. 14, 1970   Switzerland .............. 18479/70

[52] U.S. Cl. ................................... 73/432 R, 73/86
[51] Int. Cl. .............................................. G01d 21/00
[58] Field of Search .......................... 73/432 R, 86

[56] References Cited

UNITED STATES PATENTS

| | | | |
|---|---|---|---|
| 3,007,340 | 11/1961 | Kraftson | 73/432 R |
| 2,783,644 | 3/1957 | Willis | 73/86 |
| 2,870,629 | 1/1959 | Willis | 73/86 |
| 2,815,663 | 12/1957 | Lupfer | 73/86 |

*Primary Examiner*—S. Clement Swisher
*Attorney*—Werner W. Kleeman

[57] ABSTRACT

There is disclosed a measuring instrument or device equipped with a removable measured value transmitter probe, the instrument being arranged at a "receptacle", as such term is defined herein, and the probe in its operating position communicating via an opening with the interior of such receptacle. According to the invention the measuring device embodies a shut-off element which can be connected at the receptacle, and at the side of the shut-off element facing away from the receptacle there bears a guide mechanism for supporting and guiding a probe which can move from a probe inserted position where the front end of the probe is arranged in front of the shut-off element into a probe operating position wherein the probe extends through the shut-off element.

27 Claims, 3 Drawing Figures

INVENTOR.
WERNER INGOLD
BY WERNER W. KLEEMAN
ATTORNEY

MEASURING INSTRUMENT EQUIPPED WITH REMOVABLE MEASURED VALUE TRANSMITTER PROBE

BACKGROUND OF THE INVENTION

The present invention relates to a new and improved measuring device or instrument of the type equipped with a removable measured value-transmitter probe, the measuring device being arranged at a "receptacle" and the probe, when assuming its operable position, extending through an opening and communicating with the interior of the receptacle. Additionally, the measuring device of the invention incorporates a releasable locking or arresting mechanism for retaining the probe in its operable position.

A measuring device or instrument of the aforementioned general classification can serve to measure the most different types of parameters or magnitudes. Thus, for instance it can be used to determine a pH-value, pressures, temperatures, as an indicator for the filled contents of a receptacle, and so forth. In the context of this description the expression "receptacle" is to be understood as being used in its broader sense, therefore is not merely limited to containers of the most varied configuration, rather also encompasses conduits, pipes, channels, and so forth.

The prior art is already familiar with the aforementioned general type of measuring devices or instruments equipped with removable measured value-transmitter probes. Such measuring instruments serve to determine pH-values or other physical magnitudes. To this end, such state-of-the-art measuring instruments are, for instance, introduced vertically through the cover or laterally through the wall of a container. All of these known container constructions and measured value transmitters, however, possess the drawback that the dismantling and assembly, for instance for control purposes, the replacement or the graduation of the measured value transmitter, cannot be carried out under process conditions at the closed container which, for instance, is under pressure or at elevated temperature. Furthermore, a sterile reintroduction of the measurement value transmitting devices or measuring instruments is not ensured for at any of the known prior art devices.

SUMMARY OF THE INVENTION

Accordingly a real need still exists in the art for an improved construction of measuring instrument of the aforementioned type which is not associated with the previously discussed drawbacks of the prior art constructions. Therefore, a primary objective of the present invention is directed at the provision of such type measuring instrument which effectively and reliably fulfills the existing need and is not associated with the previously explained disadvantages present in the state-of-the-art constructions.

Another and more specific objective of the present invention relates to the provision of a measuring device with a removable measured value-transmitter probe of the aforementioned type which permits of assembly and dismantling of the measured value-transmitter probe at the receptacle at any time, that is to say, especially under operating conditions of the receptacle, without having to change any of the parameters existing at the receptacle, such as for instance pressure, temperature, filled contents, and so forth.

Now, in order to implement these and still further objects of the invention, which will become more readily apparent as the description proceeds, the inventive measurement value-transmitter device or measuring instrument is generally manifested by the features that it embodies a shut-off element which can be connected to the receptacle. At the side of the shut-off element facing away from the receptacle, there bears a guide mechanism for supporting and guiding the measuring probe from its inserted position in which the front end of the probe is situated in front of the shut-off element into its operating position where the probe extends through the shut-off element.

Now, by virtue of the measuring value transmitter device of the present invention which is equipped with a removable measurement value transmitter probe, hereinafter briefly simply referred to as probe, it is possible for the first time to dismantle and remount the probe, for instance equipped with a pH-electrode, at any time at the receptacle without having to change the parameters which then prevail at the receptacle. In the simplest situation, that is, if no pressure differential prevails for instance at the receptacle with regard to the surroundings, then the probe can initially be placed in its probe inserted position at the guide mechanism. After opening the shut-off element the probe can then be brought into contact with the interior of the receptacle through the shut-off element and, if desired, a channel of a connection stud of the receptacle. After the locking device has been actuated the probe is then prepared for operation. Removal of the probe can then be undertaken at any time by carrying out a reverse sequence of manipulation.

Depending upon the type of receptacle which is used and the prevailing conditions or parameters therein, as well as depending upon the employed measured value transmitter, it is necessary to differently design or construct the measurement value-transmitter device.

The invention advantageously contemplates the provision of a second releasable arresting or locking mechanism which prevents removal of the probe from the guide mechanism when it is in its inserted position. This is for instance then of advantage if an overpressure exists at the receptacle which, upon opening the shutoff element, would tend to push the probe and therefore the measurement value transmitter out of the guide mechanism. Furthermore, such second releasable arresting or locking mechanism also prevents an unauthorized removal of the probe when such has already been prepared for introduction into the receptacle, for instance has already been sterilized.

It is particularly advantageous if the measurement value transmitter device is designed such that the probe, upon assuming its inserted position in the guide mechanism, can be sterilized. To this end, this guide mechanism advantageously is equipped with a compartment or chamber surrounding the probe when the latter has assumed its inserted position. The probe is guided in this chamber or compartment in such a manner that the rear end of the probe is sealed against the outflow of fluid medium. Inflow conduit means and outflow conduit means which communicate with the probe receiving compartment or chamber of the guide mechanism serve for the introduction and removal, respectively, of a sterilizing medium, preferably hot steam or vapor, into the aforementioned compartment.

As a result of this design, it is possible to sterilize that portion of the probe which comes into contact with the internal compartment of the receptacle prior to such time as the probe assumes its operable position.

If it is necessary to use the measuring instrument or measurement value-transmitter device, for instance, at a receptacle containing a considerable overpressure, then it is advantageous to equip the measuring instrument with a suitable servo mechanism facilitating shifting of the probe from its inserted position into its operating position. While such mechanism can be randomly constructed, it is however advantageous if the probe is equipped with a flange-like widened portion, slidable in the guide portion of the equipment and forming a type of piston which can be impinged at its rear face with a pressurized medium, for instance compressed air or hydraulic oil. In fact, even the medium which is at an over-pressure in the receptacle can be, if desired, used as the pressurized medium.

Especially in the case of sensitive measurement value transmitters, such as for instance pH-electrodes, typically formed of fragile glass- and ceramic elements, it is particularly advantageous if the measurement value transmitter device or measuring instrument is equipped with a first safety mechanism preventing shifting of the probe from the inserted position into the operable position if the shut-off element is closed. In this regard, the inserted position is preferably selected such that the measured value transmitter cannot contact the shut-off element.

Additionally, it is advantageous if the measuring instrument is equipped with a second safety mechanism preventing closing of the shut-off element as long as the probe is in its operable position. In this manner it is ensured that the probe, when in its operable position, cannot be damaged by closing of the shut-off element.

Moreover, it is especially advantageous if there is provided a third safety mechanism for such receptacles whose contents are at an overpressure. This third safety mechanism prevents release of the previously mentioned second arresting mechanism which is preferably provided, during such time as the shut-off element is open. In this manner there is prevented that with an undesired release of the second arresting mechanism the measurement value transmitter device will be ejected by the fluid medium of the receptacle which is at an overpressure.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
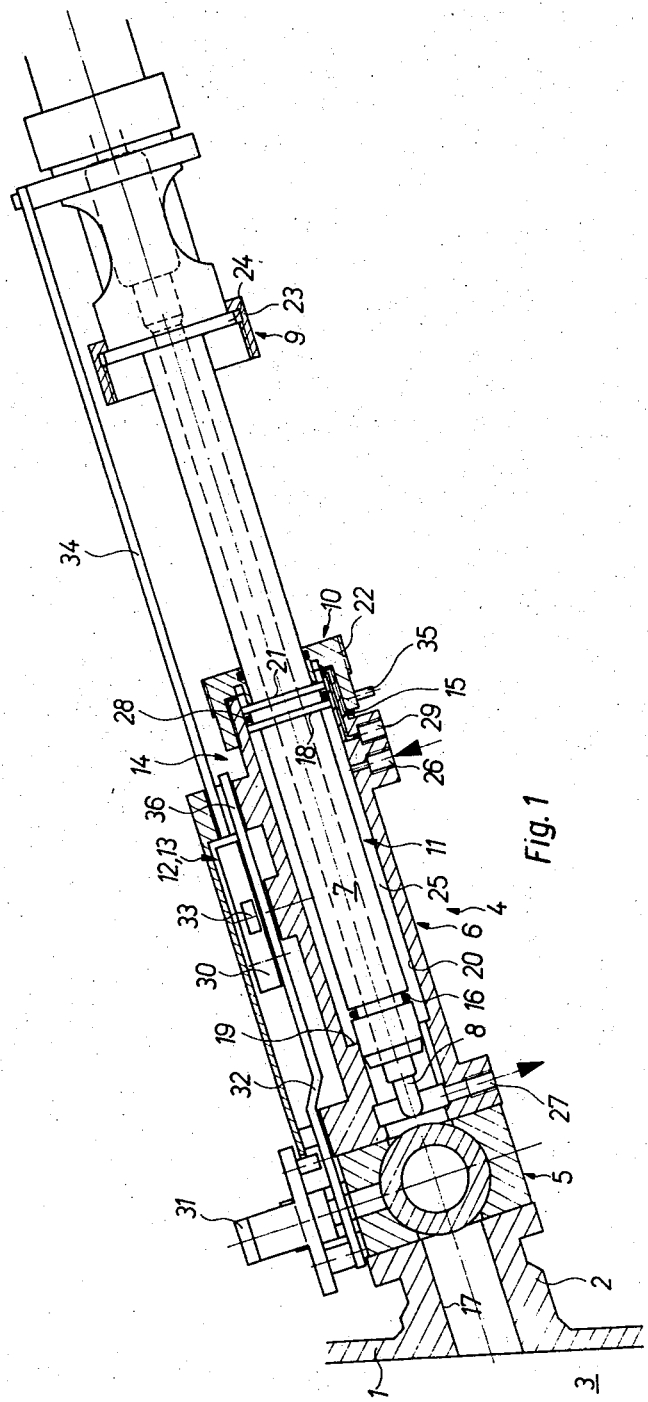
FIG. 1 is a vertical longitudinal sectional view of a preferred embodiment of measuring instrument or measurement value-transmitter device with the measurement value-transmitter probe located in its inserted position.

Describing now the drawings, a receptacle or vessel 3 schematically represented by its side wall 1 and a connection stud or nipple 2 carries the inventive measuring instrument or measurement value-transmitter device 4. This device will be seen to essentially embody a shut-off element 5 and a guide mechanism 6. More particularly, the shut-off element or mechanism 5, which in the exemplary embodiment under consideration is constructed as a ball valve unit, is mounted or arranged at the connection stud 2, and at the side of the shut-off mechanism 5 facing away from the vessel or receptacle 3 there is arranged the guide mechanism 6 within which there is displaceably mounted a measured value-transmitter probe 7, hereinafter briefly conveniently referred to simply as a probe. This probe 7 carries a measurement or measured value transmitter 8 at its tip, the transmitter 8 in the example under consideration being constructed as a pH-measurement value transmitter. Such can be for instance a combined electrode unit containing the glass and metallic electrodes, as is well known in the art.

Now the measuring instrument or measurement value transmitter device 4 further embodies a first arresting or lock mechanism 9 which retains the probe 7 in its operating position. There is advantageously provided still a second arresting or lock mechanism 10 cooperating with the guide mechanism 6 and preventing removal of probe 7 as soon as such probe has assumed the inserted position within the guide mechanism 6 as represented in the showing of FIG. 1.

Additionally, this measuring instrument is equipped with a device, generally referenced by numeral 11, enabling sterilization of the probe 7 upon assuming its inserted position.

Figure 3:
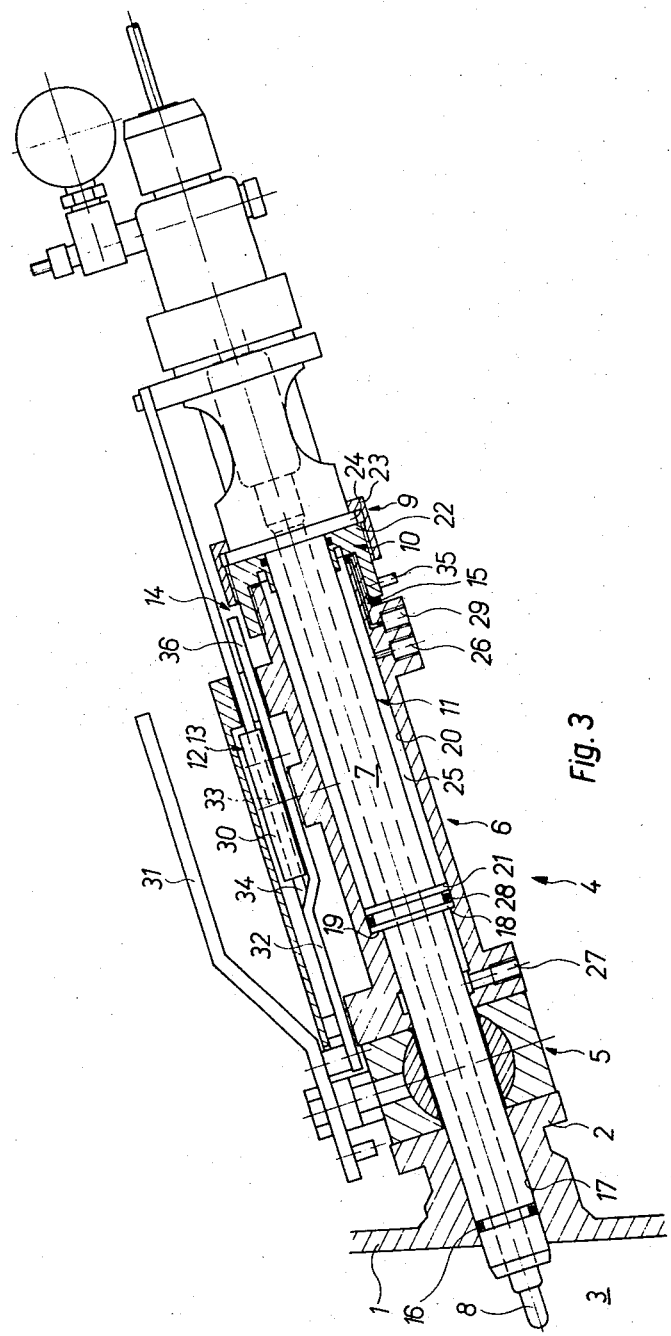
FIG. 3 is a vertical longitudinal sectional view of the measuring instrument of FIG. 1, depicting the measurement value-transmitter probe in its operable position.

Apart from the foregoing structure, the instrument also is equipped with a number of safety devices preventing erroneous operation of the measurement value-transmitter device 4 upon assembly and disassembly thereof. A first such safety device 12 serves the purpose of preventing shifting or displacement of the probe 7 from its inserted position of FIG. 1 into the operable position thereof, as indicated in FIG. 3, during such time as the shut-off element or mechanism 5 is closed. Additionally, there is provided a second safety device 13 preventing closing of the shut-off element 5 during such time as the probe 7 has assumed and retained its operable position. Finally, there is still provided a third safety device 14 preventing release of the second arresting or stop mechanism 10 as long as the shut-off element 5 is open. These different safety devices or mechanisms 12, 13 and 14 can be separate units, although in the embodiment under consideration they have been combined with one another.

Still further it is here indicated that the measurement value-transmitter device of the invention can be further equipped with a servo device 15 facilitating insertion of the probe 7 into the receptacle or vessel 3, especially when overpressure conditions prevail within such receptacle.

As already previously explained, probe 7 is equipped at its front end with the measured value transmitter 8 and at this front region of the probe is additionally equipped with a packing or seal 16 cooperating with the guide channel 17 of the connection stud 2 when probe 7 assumes its operating position of FIG. 3. More precisely, seal 16 ensures that no medium can escape out of the vessel or receptacle 3 and flow into the rearward situated portion of the measurement value-transmitter device 4. Instead of the illustrated arrangement such a seal could also be arranged in the guide channel of the connection stud 2 itself or in the guide channel which is formed by the shut-off element 5 and portions of the guide mechanism 6. However, the illustrated arrangement has been found to be particularly advantageous.

Further features of the probe will be recognized through the provision of a first stop 18 at the probe 7, stop 18 cooperating with a first stop 19 of the guide mechanism 6, whereby these stop members 18 and 19 determine the penetration depth of the probe 7 upon assuming its operable position. If desired, these stop elements 18, 19 could be easily designed to be adjustably positionable. In the case under consideration the stop 18 of the probe 7 is constructed in the form of a ring flange which is slidably mounted within the internal cylinder 20 of the guide mechanism 6, internal cylinder 20 advantageously possessing a substantially circular-shaped cross-sectional configuration. This first stop 18 constructed as a ring flange simultaneously serves as the rearward guide for the probe 7 within the guide mechanism 6.

The second arresting or lock element 10 of the probe 7 is constructed as a retaining or sleeve nut which is slidable upon this probe and can be threaded over the cylindrical guide mechanism 6. A second stop 21 bearing against the retaining nut 22 forming the second arresting mechanism 10 ensures against removal of the probe, as such has been best depicted in FIG. 1. Instead of the retaining or screw nut 22 such can be replaced by a screw cap which may be coupled with the cylindrical guide mechanism 6 in the manner of a bayonet connection. Other types of such second lock or arresting mechanisms are readily conceivable, as for instance flange connections.

Now, the first lock or arresting element 9 is constructed analogous to the just considered second arresting element 10, likewise possessing a sleeve or retaining nut member 23 which can be threaded onto the sleeve nut member 22 of the second arresting element 10 and fixing the probe 7 by means of a third stop 24 of such probe in its operable position. Once again, instead of the use of a sleeve nut member there could be used a sleeve cap which can be connected in the manner of a bayonet connection with the first sleeve nut or, if desired, the first sleeve cap. Here also it is conceivable to use other types of connections, for instance designed according to a flange type connection.

The guide mechanism 6 is constructed to provide a sterilization device 11. To this end, the internal cylinder 20 of the guide mechanism 6 is constructed so that its diameter is greater than the external diameter of that portion of the probe which piercingly extends through the shut-off element 5 up to the inner space of the vessel or receptacle 3. There is thus provided a chamber or compartment 25 which surrounds a portion of the probe 7 when the latter has assumed its inserted position, this chamber 25 being equipped with an infeed line 26 and a discharge line or connection 27 for a sterilizing medium, preferably hot steam or vapor, by way of example. By virtue of this arrangement it is possible to sterilize the portion of the probe intended to come into contact with the medium in the receptacle 3 prior to insertion of such probe into its operating position. This can be perfected, for instance, through the use of steam at a temperature of 121° C which, for instance, can act upon the probe 7 for about 30 minutes. Furthermore, the portion of the probe located in the chamber 25 of the sterilization device 11 is sealed towards the rear by means of a sealing mechanism 28. The flange-like stops 18 and 21 are suitable for this purpose and between such stops there is mounted the actual packing or seal element 28.

It will be recalled that the inventive measuring instrument can be advantageously equipped with a servo mechanism for facilitating insertion of the probe into the operable position it assumes in relation to the receptacle. To this end, there is provided the servo mechanism 15 which is formed by the portion of the guide mechanism 6 disposed between the stop 21 and the sleeve nut 22 as well as the infeed line 29, through which a pressurized medium, preferably hydraulic oil, can be forced into the cylinder space behind the second stop 21. The sleeve nut member 22 is sealed with regard to the probe 7. Furthermore, the second stop 21 is sealed with respect to the forward portion of the probe 7 and forms a piston against which acts the pressurized medium. With the help of this piston-cylinder arrangement the probe can be shifted, even if great overpressure prevails in the receptacle 3, into its operable position.

Figure 2:
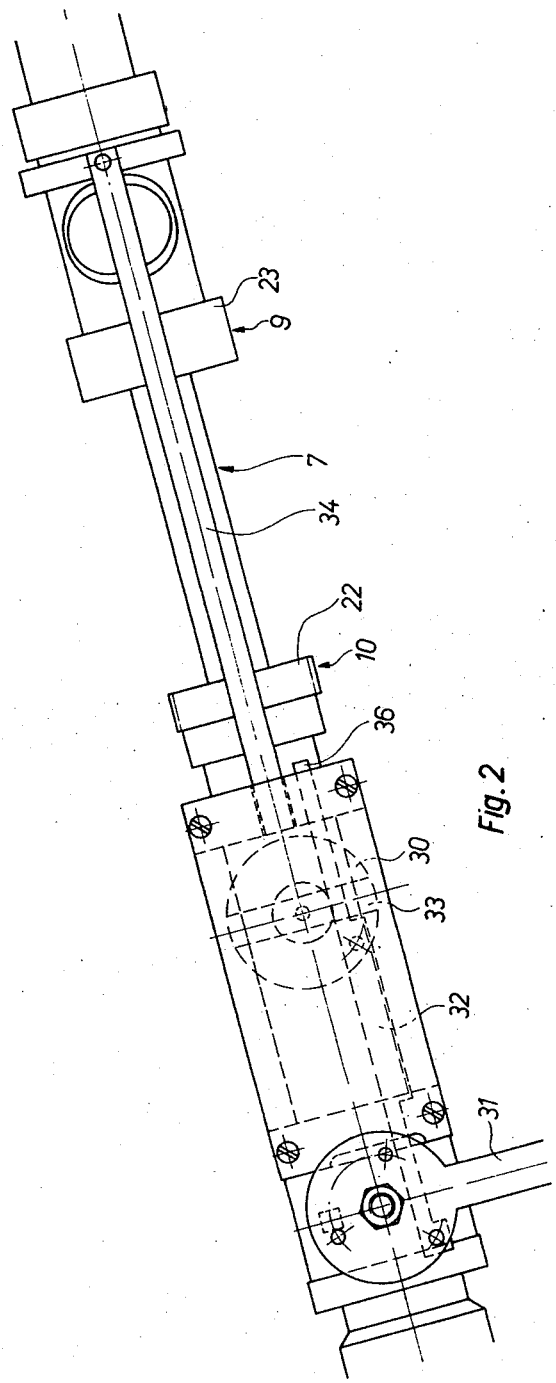
FIG. 2 is a top plan view of the measuring instrument depicted in FIG. 1.

Now, the first safety mechanism 12 which is intended to prevent a shifting of the probe 7 from its inserted position forwardly of the shut-off element i.e. behind such element as shown in FIG. 1 into its operable position, as shown in FIG. 3 as long as the shut-off element 5 is closed, will be seen to comprise a blocking or locking element 30 rotatably mounted at the guide mechanism 6. The position of the blocking element 30 is determined by the position of the manual lever or operating member 31 of the shut-off element or device 5. This manually operated lever 31 and the blocking element 30 are connected by a coupling rod 32 with one another, coupling rod 32 being articulated both with the manually operable actuation element 31 as well as with the blocking element 30. This blocking element 30 will be seen to further possess a passage or opening 33 which, when the shut-off element is closed as such has been illustrated in FIGS. 1 and 2, is situated transverse to the displacement path of a rod-shaped safety stop 34 fixedly connected with the probe 7. In this position the blocking element 30 does not free the passage or opening 33 for traverse by the rod-shaped safety stop 34. On the other hand, when the shut-off element 5 is opened, as indicated in FIG. 3, then the passage or opening 33 is rocked into the displacement path of the rod-shaped safety stop 34 so that such can enter into this passage 33, while the probe 7 itself can be displaced through the opened shut-off element 5 into its operating position.

The second safety mechanism 13 which prevents closing of the shut-off element 5 as long as the probe has remained in its operating position, in the exemplary embodiment under consideration is identical to the first safety mechanism 12. In the operating position of the probe the rod-shaped safety stop 34 engages through the passage 33 of the blocking element 30 so that such can no longer be pivoted as long as the rod-shaped safety stop 34 is disposed within the aforementioned passage or opening 33. Consequently, the manually operated element 31 of the shut-off element or mechanism 5, which it will be recalled is coupled with the blocking element 30, can likewise no longer be rocked. Instead of the first and second safety mechanisms 12, 13 being combined such could be, of course, provided as separate safety devices.

Finally, the third safety mechanism 14 which prevents release of the second arresting or lock mechanism 10 when the shut-off element is opened, will be seen to comprise a stop 35 arranged at the second arresting mechanism 10, that is, at the sleeve or retaining nut 22 thereof. A blocking or locking rod 36 coupled with the shut-off element 5 extends into the path of displacement of the stop 35 when the shut-off element 5 is open. As a result, the second arresting mechanism 10, that is to say, the second sleeve cap or nut member 22 cannot be actuated. On the other hand, when the shut-off element is closed the blocking rod 36 is again retracted, as such will be best observed by referring to FIG. 1. In the exemplary embodiment of equipment under consideration the blocking or locking rod 36 is formed as an extension of the coupling rod 32 which is already present for the first and second safety mechanisms 12, 13.

Furthermore, it will be observed that in the embodiment of equipment under consideration the measurement value-transmitter device 4 is arranged at the receptacle 3 so as to possess a slight inclination. Consequently, the internal electrolytic solution of the electrodes is always located at the lowest position of the equipment and the sterilization vapors or condensate which are present during sterilization of the equipment can flow away downwardly. However, it is also possible in other situations to mount the measuring instrument or measurement value transmitter device so as to assume a different position. This measuring instrument can also be arranged more or less perpendicular to the cover of a vessel or receptacle.

Finally, it is here mentioned that, if desired, the measurement value-transmitter device can be constructed such that the interior of the probe is at a pressure greater than the internal pressure of the vessel or receptacle.

While there is shown and described present preferred embodiments of the invention, it is to be distinctly understood that the invention is not limited thereto but may be otherwise variously embodied and practiced within the scope of the following claims.

What is claimed is:

1. In a measurement value-transmitter device having a removable measurement value-transmitter probe and capable of being arranged at a receptacle, with said probe shiftable between an inserted position and an operable position where the probe communicates via an opening with the interior of the receptacle, the improvement comprising a shut-off element capable of assuming a respective open and closed position connectable with the receptacle and slidably receiving said probe when said shut-off element is in its open position, a guide mechanism mounted at the side of the shut-off element facing away from the receptacle, said guide mechanism serving to support and guide said probe during movement from its inserted position where the front end of the probe is disposed forwardly of said shut-off element into its operable position during which time said shut-off element is in its open position, and said guide mechanism disposed in front of said shut-off element comprises means for sterilizing the probe when it assumes its inserted position.

2. The improvement as defined in claim 1, wherein said guide mechanism embodies a compartment which surrounds the probe when in its inserted position, means for providing a fluid-seal at said compartment for the rearwardly extending portion of the probe when within said compartment, and means providing an infeed line and a discharge line at said compartment for a sterilization medium.

3. The improvement as defined in claim 2, further including substantially flange-like guide means provided for said probe situated in front of said shut-off element when said probe assumes its operable position, said guide means incorporating a sealing ring at its periphery.

4. The improvement as defined in claim 3, further including a servo mechanism for facilitating the shifting of the probe from its inserted position into its operable position.

5. The improvement as defined in claim 4, wherein said serve mechanism is provided at the rear side of said flange-like guide means with a chamber constructed as a pressure compartment and equipped with an infeed means for a pressurized medium.

6. In a measurement value-transmitter device having a removable measurement value-transmitter probe and capable of being arranged at a receptacle, with said probe shiftable between an inserted position and an operable position where the probe communicates via an opening with the interior of the receptacle, the improvement comprising a shut-off element capable of assuming a respective open and closed position connectable with the receptacle and slidably receiving said probe when said shut-off element is in its open position, a guide mechanism mounted at the side of the shut-off element facing away from the receptacle, said guide mechanism serving to support and guide said probe during movement from its inserted position where the front end of the probe is disposed forwardly of said shut-off element into its operable position during which time said shut-off element is in its open position, and a first safety mechanism preventing shifting of said probe from its inserted position into its operable position during such time as said shut-off element is in its closed position.

7. The improvement as defined in claim 6, wherein said first safety mechanism comprises a first blocking element coupled with said shut-off element, a first safety stop carried by said probe and movable along a predetermined path of travel, said first blocking element blocking said path of travel of said first safety stop as long as said shut-off element is closed.

8. The improvement as defined in claim 7, wherein said shut-off element includes a manually operable element, said blocking element being defined by a disc member rotatably mounted at said guide mechanism, a coupling rod coupling said disc member with said manually operable element of said shut-off element, said disc member possessing a through passage opening for said first safety stop at said probe, said first safety stop being in the form of a rod member, said disc member and its through passage opening being rotated into a position when said shut-off element is closed such that said rod member cannot pass through said through passage opening, said disc member further being rotated when said shut-off element is in its open position such that said through passage opening is disposed at a location permitting free through passage of said rod member.

9. The improvement as defined in claim 8, further including a second safety mechanism which prevents closure of said shut-off element as long as said probe is in its operable position.

10. The improvement as defined in claim 9, wherein said second safety mechanism comprises a second blocking element coupled with said probe and which is connected with said manually operable element of said shut-off element and prevents rotation of said shut-off element during such time as said probe has assumed its operable position.

11. The improvement as defined in claim 10, wherein said first safety mechanism simultaneously serves as said second safety mechanism, said rod member preventing rotation of said blocking element which is common to said first and second safety mechanisms.

12. In a measurement value-transmitter device having a removable measurement value-transmitter probe and capable of being arranged at a receptacle, with said probe shiftable between an inserted position and an operable position where the probe communicates via an opening with the interior of the receptacle, the improvement comprising a shut-off element capable of assuming a respective open and closed position connectable with the receptacle and slidably receiving said probe when said shut-off element is in its open position, a guide mechanism mounted at the side of the shut-off element facing away from the receptacle, said guide mechanism serving to support and guide said probe during movement from its inserted position where the front end of the probe is disposed forwardly of said shut-off element into its operable position during which time said shut-off element is in its open position, a releasable arresting mechanism for retaining said probe in its operable position, an additional releasable arresting mechanism for preventing removal of the probe out of said guide mechanism when said probe has assumed its inserted position, and a safety mechanism for preventing release of said additional arresting mechanism as long as said shut-off element is open.

13. The improvement as defined in claim 12, wherein said safety mechanism embodies a blocking rod arranged at said shut-off element, said additional arresting mechanism incorporating a movable stop member, said blocking rod extending into the path of movement of said movable stop member when the shut-off element is in its open position and being retracted out of the path of movement of said movable stop member when said shut-off element is in its closed position.

14. The improvement as defined in claim 13, further including an additional safety mechanism for preventing shifting of the probe from its inserted position into its operable position as long as said shut-off element is closed, said additional safety mechanism incorporating a coupling rod which simultaneously serves as said blocking rod of the aforesaid safety mechanism.

15. A measurement value-transmitter device comprising a removable measurement value-transmitter probe having a front end portion and capable of being arranged at a receptacle, a shut-off element capable of assuming a respective opened and closed position connectable with the receptacle and slidably receiving said probe when said shut-off element is in its open position, a guide mechanism for supporting and guiding the probe, said probe being shiftable in said guide mechanism between an inserted position in which said front end portion is located behind said shut-off element removed from the receptacle into its operable position in which said probe piercingly extends through said shut-off element and communicates with the receptacle, a first releasable arresting mechanism for retaining said probe in its operable position, and a first safety mechanism for retaining said probe at a spacing from said shut-off element and preventing shifting of said probe from its inserted position into its operable position during such time as said shut-off element is in its closed position.

16. The measurement value-transmitter device as defined in claim 15 wherein said first safety mechanism comprises a first blocking element coupled with said shut-off element, a first safety stop carried by said probe and movable along a predetermined path of travel, said first blocking element blocking said path of travel of said first safety stop as long as said shut-off element is closed.

17. The measurement value-transmitter device as defined in claim 16, wherein said shut-off element includes a manually operable element, said blocking element being defined by a disc member rotatably mounted at said guide mechanism, a coupling rod coupling said disc member with said manually operable element of said shut-off element, said disc member possessing a through passage opening for said first safety stop at said probe, said first safety stop being in the form of a rod member, said disc member and its through passage opening being rotated into a position when said shut-off element is closed such that said rod member cannot pass through said through passage opening, said disc member further being rotated when said shut-off element is in its open position such that said through passage opening is disposed at a location permitting free through passage of said rod member.

18. The measurement value-transmitter device as defined in claim 17, further including a second safety mechanism which prevents closure of said shut-off element as long as said probe is in its operable position.

19. The measurement value-transmitter device as defined in claim 18, wherein said second safety mechanism comprises a second blocking element coupled with said probe and which is connected with said manually operable element of said shut-off element and prevents rotation of said shut-off element during such time as said probe has assumed its operable position.

20. The measurement value-transmitter device as defined in claim 19, wherein said first safety mechanism simultaneously serves as said second safety mechanism, said rod member preventing rotation of said blocking element which is common to said first and second safety mechanisms.

21. The measurement value-transmitter device as defined in claim 17, further including a second releasable arresting mechanism for preventing removal of said probe when in its inserted position from said guide mechanism, and a third safety mechanism for preventing release of said second arresting mechanism as long as said shut-off element is in its opened position.

22. The measurement value-transmitter device as defined in claim 21, wherein said first safety mechanism embodies a blocking rod arranged at said shut-off element, said second arresting mechanism incorporating a movable stop member, said blocking rod extending into the path of movement of said movable stop member when the shut-off element is in its open position and being retracted out of the path of movement of said movable stop member when said shut-off element is in its closed position.

23. The measurement value-transmitter device as defined in claim 21, wherein said coupling rod simultaneously serves as a blocking rod for said third safety mechanism.

24. The measurement value-transmitter device as defined in claim 15, further including a servo mechanism for facilitating shifting of the probe from its inserted position into its operable position.

25. A measurement value-transmitter device as defined in claim 15, wherein said guide mechanism comprises a cylinder having a rear end, a second releasable arresting mechanism for closing-off the rear end of said cylinder, said second arresting mechanism sealingly enclosing said probe and preventing removal thereof from said guide mechanism when said probe has assumed its inserted position, and guide ring means provided for said probe and slidably guided in said guide cylinder.

26. The measurement value-transmitter device as defined in claim 25, further including a servo mechanism for facilitating shifting of the probe from its inserted position into its operable position, said servo mechanism comprising a pressure compartment formed by said guide ring means sealingly contacting said guide cylinder and said pressure compartment further being formed by said second arresting mechanism and said guide cylinder, and an infeed line for a pressurized medium opening into said pressure compartment.

27. The measurement value-transmitter device as defined in claim 26, further including infeed means and outfeed means for a sterilization medium communicating with the interior of said guide cylinder.

* * * * *